455-606
3/5/85    XR    4,502,753

United States Patent [19]
Flocon

[11] Patent Number: 4,502,753
[45] Date of Patent: Mar. 5, 1985

[54] TERMINATION DEVICE USING A DIRECTIONAL COUPLER WHICH COMPENSATES FOR THE PARASITIC RADIATION FROM A LIGHT SOURCE VIA A COMPENSATION SIGNAL

[75] Inventor: Alain Flocon, Antony, France

[73] Assignee: Telecommunications Radioelectriques T.R.T., Paris, France

[21] Appl. No.: 401,041

[22] Filed: Jul. 22, 1982

[30] Foreign Application Priority Data

Jul. 31, 1981 [FR]  France ................ 81 14946

[51] Int. Cl.$^3$ ................................ G02B 5/14
[52] U.S. Cl. ..................... 350/96.16; 350/96.10; 350/96.15; 350/96.20; 455/600; 455/606
[58] Field of Search ............... 350/96.15, 96.16, 96.20, 350/96.21, 96.10, 96.13, 96.14, 96.29; 250/227; 455/600, 601, 606, 613, 619

[56] References Cited

U.S. PATENT DOCUMENTS

| 3,252,000 | 5/1966 | McNaney | 350/96.29 |
| 3,717,769 | 2/1973 | Huffard et al. | 350/96.15 |
| 3,943,358 | 3/1976 | Reymond et al. | 350/96.29 |
| 3,996,526 | 12/1976 | D'Auria et al. | 350/96.15 |
| 4,002,896 | 1/1977 | Davies et al. | 350/96.15 |
| 4,246,475 | 1/1981 | Altman | 350/96.15 |
| 4,289,373 | 9/1981 | Sugimoto et al. | 350/96.16 |
| 4,294,513 | 10/1981 | Nelson et al. | 350/96.17 |
| 4,329,659 | 5/1982 | Chen | 350/96.15 |
| 4,340,272 | 7/1982 | Papuchon et al. | 350/96.14 |

FOREIGN PATENT DOCUMENTS 2049219 12/1980 United Kingdom ............. 350/96.15

OTHER PUBLICATIONS

Stewart et al., "Directional Coupler . . . Optical Fibre", 2nd Eur. Coll. on Opt. Fibers, Paris, 9/76, pp. 267–268.

Primary Examiner—William L. Sikes
Assistant Examiner—Brian M. Healy
Attorney, Agent, or Firm—Robert T. Mayer; Algy Tamoshunas

[57] ABSTRACT

A device for coupling a light source and an optical detector to one end of an optical fiber employed for two-way transmission of information. So as to reduce the effect of parasitic radiation coming from the light source and reaching the detector, a second light source is used which is arranged in such a way that it likewise excites the detector and is modulated by a compensation signal. The compensation signal is derived from the information signal modulating the first light source and its phase and amplitude are controlled so as to compensate for the modulation of the parasitic radiation. This increases the transmission range and makes it possible to use the same radiation wavelength for the two transmission directions.

6 Claims, 2 Drawing Figures

TERMINATION DEVICE USING A DIRECTIONAL COUPLER WHICH COMPENSATES FOR THE PARASITIC RADIATION FROM A LIGHT SOURCE VIA A COMPENSATION SIGNAL

The invention relates to a device for coupling a light source and an optical detector to one end of an optical fiber employed for two-way transmission of information to the other end of this fiber, this device comprising means for extracting from the fiber and directing towards the said detector the radiation received from the other end of the fiber.

A coupling devices of this type makes it possible to establish simultaneous duplex communications between two terminals which are interconnected by means of one single optical fiber. But in these devices for optically coupling a light source and an optical receiver to an optical fiber, the same difficulties are encountered as in the devices for electrically coupling a transmitter and a receiver of electric signals to a transmission line. A fraction of the light radiation supplied by the light source resulting from by light leaks and/or optical reflections produced, for example, by connectors inserted in the optical transmission path may reach the detector. This parasitic light radiation which has the local light source as its origin, is superposed in the detector on the light radiation which carries the useful information coming from the remote light source, and may reduce to a very large extent the distances over which simultaneous duplex communication is possible.

So far, to overcome these problems, light radiation wavelengths have been used which were different for each transmission direction. It is therefore possible to reduce, by purely optical means, the parasitic coupling between a local light source transmitting a radiation of one wavelength and a local detector designed for detecting a radiation of a different wavelength, coming from the remote light source. In, for example, the coupling device described in French Pat. No. 2,454,634, an optical network is used to deflect towards a detector the radiation coming from the remote light source, so that a parasitic radiation coming from the local light source and produced by reflection in the optical transmission path is deflected in a different way and does not reach the detector. However, a direct parasitic coupling may still exist. On the other hand, the use of different wavelengths for the two transmission directions renders it necessary to use different equipment at the two ends of the link, which makes maintenance more difficult and increases the costs of the link.

The present invention relates to any type of device coupling a light source and an optical receiver to one end of an optical fiber and has for its object to reduce the parasitic coupling between this source and this receiver, whatever the origin, so as to render it be possible to use one single radiation wavelength for the two transmission directions.

According to the invention, a second light source producing a radiation which is detectable by the optical detector is arranged in such a way that it can likewise excite this detector. The second light source is modulated by a compensation signal which is derived from the information signal which has for its object to modulate the first light source and whose phase and amplitude are controlled to compensate for the modulation of the parasitic radiation coming from the first light source and reaching the detector.

The following description which will be given by way of example with reference to the accompanying drawings will make it better understood how the invention can be put into effect.

Figure 1:
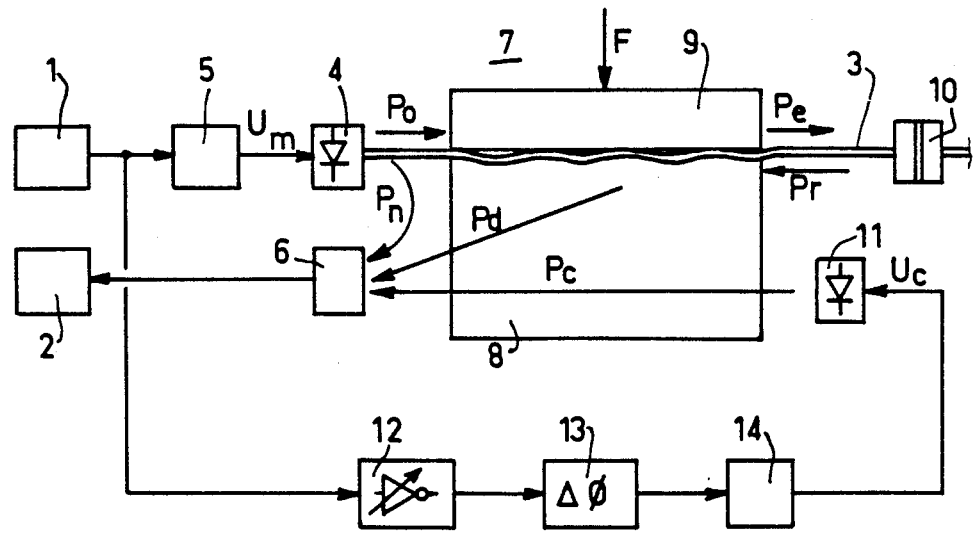
FIG. 1 shows the coupling device in accordance with the invention associated with one end of the fiber which transmits a radiation of one single wavelength.

FIG. 1 shows an information signal source 1 and an information signal receiver 2, which forms part of a local exchange. A remote exchange, not shown, also comprises an information signal source and an information signal receiver. The information signals produced by the two exchanges are to be transmitted in simultaneous duplex transmission via an optical link formed by the optical fiber 3.

In order to produce in the optical fiber 3 a radiation modulated by the information signal from source 1, a light source is employed which is constituted by an electroluminescing diode 4. The emitting surface of diode 4 faces the end of the fiber 3 and is modulated by a modulation signal $U_m$ which is derived by the excitation circuit 5 from the information signal of source 1. The purpose of circuit 5 is to match the information signal to the signal necessary to excite the diode. The portion modulated by the radiation power transmitted by the diode 4 and which enters the fiber 3 is denoted $P_o$. In a general manner, when hereinafter the radiation powers are described, it should be understood that it relates to the modulated portions of these powers.

A directional coupler 7 extracts from the optical fiber 3, the received radiation, which is modulated by the information signal from the remote source and directs it to the optical detector 6 connected to the input of the receiver 2. The coupler 7 may, for example, be of the known type described in a publication by C. and W. J. Stewart "Directional Coupler for single multimode optical fibre" at the second European Colloquium on transmission by means of optical fibers, Paris, 27-30 September 1976 and published by the Committee of the Colloquium 11, Rue Hamelin, 75783 Paris (Câbles et Connexions, deuxième partie, p. 267–268). In accordance with the simplified representation shown in the Figure, coupler 7 comprises a plate 8 made of a transparent material, for example plexiglass, one face of which has an undulation which constitutes a network. A second plate 9, to which a force F is applied, presses the fiber 3 against the undulated face of the plate 8 so as to produce a periodical deformation of the fiber. The optical contact between the undulated face of the plate 8 and the fiber makes it possible for a fraction of the received radiation to pass into the plate 8 and to be directed partially, by optical arrangements not shown, to the detector 6. When the received radiation power is designated $P_r$ and the portion of this power reaching the detector 6 is designated $P_d$, it is, for example, obtained that:

$$P_d = P_r - 17 \text{ dB}.$$

However, due to imperfections inherent to the optical coupler 7, a fraction of the radiation power produced by the electroluminescent diode 4 may also reach the detector 6. Thus, for example in the coupler 7, a portion of the radiation power $P_o$ which enters the fiber 3 is transmitted into the plate 8 and it is difficult to wholly prevent a fraction of this transmitted power from reaching the detector 6. On the other hand, when the optical transmission path is the seat of discontinuities caused, for example, by a connector 10, a fraction of the radiation power $P_e$ coming from the coupler 7 may be reflected by this discontinuity. Since this reflected portion propagates in the fiber 3 in the same direction as the received power of radiation $P_r$, it is directed in the same manner to the detector 6. For all these various reasons, there is superimposed on the useful radiation modulated by the remote source and reaching the detector 6 with a power $P_d$, a parasitic radiation modulated by the local source 1. The power of such parasitic radiation, whatever its origin, in the region of the detector 6 is denoted $P_n$. We have, for example: $P_n = P_o - 27$ dB. In the case where $P_d = P_r - 17$ dB, it can be easily seen that it is only possible to effect a duplex transmission when the attenuation produced in the optical link is less than 10 dB, which significantly limits the transmission range.

The present invention furnishes a simple and efficient means to compensate for the parasitic radiation power $P_n$ which reaches the detector 6, without using in the two-way link radiations having wavelengths which are different for the two transmission directions.

According to the invention, a second light source, formed by the electroluminescent diode 11 transmits a radiation which is detectable by the detector 6. Relative to the detector 6, diode 11 is arranged on the other side of the transparent plate 8 in such a way that the transmitted radiation can reach the detector 6. the electroluminescent diode 11 is modulated by a compensation signal $U_c$, which is derived from the information signal produced by the source 1 by means of the cascade arrangement of a variable-gain inverting amplifier circuit 12, a controllable phase shifting circuit 13 and an excitation circuit 14, which has the same function as the excitation circuit 5. Since the signals $U_m$ and $U_c$ which modulate the diodes 4 and 11 have the same origin, namely the information signal from source 1, it will be clear that by appropriately controlling the gain of the inverting amplifier 12 and the phase shift produced by the circuit 13 it is possible to cause the modulation of what is commonly referred to as the compensation radiation produced by the diode 11 and reaching the detector 6 to have an amplitude equal to and a phase opposite to the modulation of the parasitic radiation which also reaches the detector 6. The power $P_n$ of the parasitic radiation is then accurately compensated in the region of the detector 6 by the power $P_c$ of the compensation radiation and the effect of this parasitic radiation is cancelled. It is then easy to proceed to the correct control of the gain and the phase shift produced by the circuits 12 and 13 by verifying that, when only the local source 1 produces an information signal, the local receiver 2 does not receive any signal.

It must be understood that the invention relates to any type of optical coupler having four access ports, such as the coupler 7 shown in FIG. 1.

The use of these coupling devices in a two-way transmission system via an optical fiber renders it possible to increase the transmission range considerably, to employ the same wavelength of the radiation for the two transmission directions and, finally, to employ identical terminal equipment.

Figure 2:
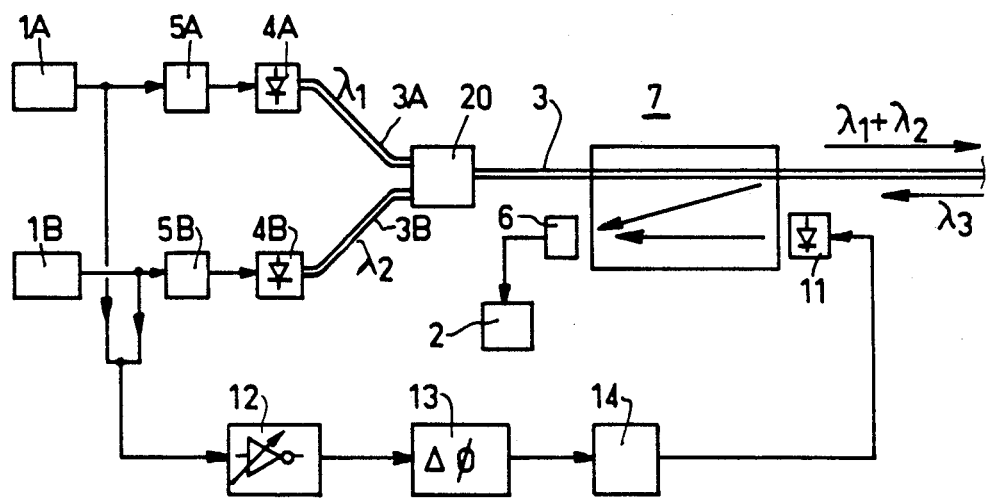
FIG. 2 shows this device associated with an end of the optical fiber which transmits radiations having different wavelengths.

It is, of course, alternatively possible to use the coupling device in accordance with the invention in a transmission system using different radiation wavelengths for the two transmission directions provided the detector of the coupler can detect all these wavelengths. It is alternatively possible to use the same compensation circuit and the same compensation radiation source to compensate for a parasitic radiation coming from several sources using useful radiation having different wavelengths. These possibilities are employed in the terminal equipment shown in FIG. 2.

In this Figure, the components which are the same as those in FIG. 1, have been given the same reference numerals. There are shown two information signal sources 1A and 1B which, by means of the excitation circuits 5A and 5B modulate the two electroluminescent diodes 4A and 4B, which transmit radiation of the wavelength $\lambda_1$ and $\lambda_2$, respectively. These radiations are transmitted in the two further optical branches 3A and 3B, respectively, which are connected to the optical multiplex device 20. The output of the latter is connected to the optical fiber 3 through which either the one or the other of the two radiations of the wavelength $\lambda_1$ and $\lambda_2$ are transmitted towards the other end, not shown, of the fiber. Let it be assumed that at the other end, a radiation of a different wavelength $\lambda_3$ is transmitted which reaches the end of the fiber shown in the Figure. In order to extract from the fiber 3 radiation of the wavelength $\lambda_3$, a coupler 7 which is shown in a simplified manner and which comprises a radiation detector 6 coupled to a receiver 2, is used. In accordance with the invention, this coupler 7 incorporates an electroluminescent diode 11 which is modulated by a compensation signal derived from the signal supplied by the source 1A and/or the source 1B via the cascaded circuit 12, 13, 14. With a detector 6 which is sensitive to radiations of the wavelength $\lambda_1$, $\lambda_2$ and $\lambda_3$ a compensation of the parasitic radiation of the wavelength $\lambda_1$ and/or $\lambda_2$, which reach this detector is obtained. The arrangement shown in FIG. 2 may of course comprise more than two sources transmitting radiation having different wavelengths.

What is claimed is:

1. A terminal device for an optical fiber used for two-way transmission of information, said device comprising a first light source coupled to one end of the optical fiber, means for modulating radiation emitted by said first light source with an information signal to be transmitted to the other end of said fiber, an optical detector, means for extracting radiation sent though said fiber from the other end thereof and directing said extracted radiation to said optical detector, a second light source arranged so that radiation emitted thereby is directed to said optical detector, second means for modulating the radiation emitted by said second source with a compensation signal, and means for deriving, from said information signal, said compensation signal of an amplitude and phase such that the radiation from said second source which is modulated by said compensation signal and is incident on said optical detector reduces interference due to parasitic modulated radiation from said first source reaching said optical detector.

2. The device according to claim 1 wherein the wavelength of the radiation emitted by said first light source and coupled to said one end of said optical fiber is equal to the wavelength of the radiation sent to said one end from the other end of said fiber.

3. The device according to claim 1 or 2 wherein said extracting means includes a directional coupler coupled to said one end of the optical fiber and to said first light source, said directional coupler having a low loss path for transmitting the modulated radiation from said first light source to said one end of said optical fiber and a second path along which a fraction of the radiation sent from said other end of said fiber is deflected, said optical detector being coupled to said second path so as to receive said fraction of the radiation sent from said other end.

4. The device according to claim 1 wherein said deriving means includes means for controlling the amplitude and phase of said compensation signal so that the modulated radiation from said second source incident on said optical detector cancels the modulation of said parasitic radiation from said first source reaching said optical detector.

5. The device according to claim 1 wherein said first and second light source is a light emitting diode.

6. The device according to claim 1 including a further light source emitting radiation of a wavelength which is different from the wavelength of the radiation emitted by said first light source, further means for modulating the radiation emitted by said further source with a further information signal, means for coupling the modulated radiation emitted by said first and further sources to said one end of said fiber for transmission to the other end thereof, and wherein said deriving means derives said compensating signal from the first-named information signal and said further information signal so that said second light source is modulated by said compensating signal which is dependent on the information signals modulating each of said first and further light source.

* * * * *